3,290,404
PROCESS FOR THE ISOMERIZATION
OF OLEFINS
Eric James Howman, Richard Norman Lacey, and Leonard Turner, Sunbury-on-Thames, England, assignors to The British Petroleum Company Limited, London, E.C. 2, England, a British joint-stock corporation
No Drawing. Filed July 3, 1963, Ser. No. 292,716
Claims priority, application Great Britain, July 9, 1962, 26,239/62
7 Claims. (Cl. 260—683.2)

This invention relates to a process for the isomerization of olefinic hydrocarbons by double bond migration.

In British patent application No. 28,571/61, now British Patent No. 1,002,394, there is described a process for isomerizing olefins by double bond migration which comprises passing the olefin over a supported catalyst containing nickel which, under the operating conditions, is present in major proportion as elemental nickel, said catalyst having been modified by treatment with (a) elemental sulphur or (b) an organic sulphur compound or (c) $H_2S$ or (d) $CS_2$ or (e) a mixture of two or more components selected from (a), (b), (c) and (d), said treatment being carried out under conditions such that a minor proportion of the nickel present in the catalyst is thereby combined with sulphur. The isomerization reaction is said to be preferably carried out at a temperature in the range 50° C. to 250° C., and there is illustrated the single stage isomerization of 4-methylpentene-1 at temperatures of 152° C., 178° C. and 202° C.

It is well known that most hydrocarbon isomerization reactions do not go to completion but produce an equilibrium mixture of isomers, the equilibrium amounts of each isomer varying according to the operating conditions employed. When utilising the catalysts set out in British patent application No. 28,571/61, now British Patent No. 1,002,394 for the production of isomers, the theoretical equilibrium amounts of which are higher at lower temperatures, for example for the production of 2-methylpentene-2 from 4-methylpentene-1 where at 160° C. a conversion to 2-methylpentene-2 of 64% is the theoretical maximum whereas at 90° C. the corresponding figure is 72%, it has been found that when operating the single stage process set out in British patent application No. 28,571/61, now British Patent No. 1,002,394 at the lower temperatures which favour higher conversion, at all practical feed-rates considerably less than the theoretical maximum conversion is achieved. This can be disadvantageous when it is desired to obtain high conversion.

It has now been found that if the isomerization is carried out at two different temperatures in the ranges hereinafter set out, very much higher conversions and substantially the theoretical equilibrium corresponding to the lower temperature can be achieved.

Accordingly, the present invention provides a process for the isomerization of olefins by double bond migration which comprises passing the olefin over a supported catalyst containing nickel which, under the operation conditions, is present in major proportion as elemental nickel, said catalyst having been modified by treatment with (a) elemental sulphur or (b) an organic sulphur compound or (c) $H_2S$ or (d) $CS_2$ or (e) a mixture of two or more components selected from (a), (b), (c) or (d), said treatment being carried out under conditions such that a minor proportion of the nickel present in the catalyst is thereby combined with sulphur, said olefin being passed over said catalyst at a temperature in the range 140 to 180° C. and the isomerization product therefrom being passed over said catalyst at a temperature in the range 60° to 100° C.

The process of the present invention may be carried out by passing the product stream from the higher temperature stage over a separate catalyst bed at the lower temperature or the initial product stream may be recycled to the catalyst bed used in the first stage, the temperature being lowered to the desired figure. A further mode of carrying out the process of the present invention is to pass the olefin over a single catalyst bed over which there exists a temperature gradient 140°–180° C. to 60°–100° C. Suitably the temperature in the higher range will be about 160° C. and that in the lower range about 90° C.

Isomerization in accordance with the present invention may be carried out using as feedstock any olefin capable of double bond migration or a mixture comprising at least one such olefin. Clearly, when employing mixtures, the components will not be present in the equilibrium proportions corresponding to the isomerization conditions.

The olefin may be a mono-olefin, di-olefin or other polyolefin; however the preferred feedstocks are mono-olefins, preferably having 4 to 6 carbon atoms per molecule. The process of the present invention is suitable for the isomerization of methylpentenes, particularly 4-methylpentene-1, 4-methylpentene-2 or 2-methylpentene-1 to 2-methylpentene-2; also the conversion of 2-methylbutene-1 and/or 3-methylbutene-1 to 2-methylbutene-2 and also for the conversion of pentene-1 to cis- and trans-pentene-2.

The reaction pressure may be sub-atmospheric, atmospheric or super-atmospheric; the pressure being selected in order to maintain either liquid phase or vapour phase conditions as desired. Suitably the isomerization will be carried out in the presence of a carrier gas, for example nitrogen or hydrogen.

The preparation of the isomerization catalyst and its subsequent modification to incorporate sulphur therein may be carried out in any convenient manner, the following three methods being merely illustrative.

(a) The catalyst may be prepared on the base by an impregnation technique by dissolving in water a nickel salt, for example nickel nitrate, and impregnating the support material with it. The support material may be conveniently in the form of granules or pellets of any desired size formed from group support material. After impregnation, the catalyst is dried and is then in a form in which it can be stored for long periods without deterioration. In order to use the catalyst, it must be activated by heating to decompose the salt; in the case of the nitrate this required a temperature of about 500–550° C., and the nickel will be converted to the oxide. Final activation by reduction to metallic nickel can be carried out in a stream of hydrogen or hydrogen-containing gas at a temperature of 150° to 600° C. and at a pressure of 0–200 lbs./sq. in. gauge. The time of treatment depends upon the temperature. Typical conditions using a sepiolite catalyst support are 16 hours at 500° C. and atmospheric pressure; no damage results to the sepiolite however, if it is heated at a temperature above 600° C.

(b) The catalyst may be prepared by milling dry nickel formate with powdered catalyst support, and the mixture subsequently pelleted. The advantage of this method of preparation is that a salt such as nickel formate reduces directly to nickel (without going through the oxide state) in a non-oxidising atmosphere, for example in an inert gas or hydrogen stream at a temperature of 150° C. to 300° C. At 250° C. treatment for 4 hours will usually be appropriate. This method has the advantage that it is not necessary to heat large quantities of catalysts to temperatures of 500° C. and higher.

(c) The catalyst may be prepared by a technique which utilises the water soluble complex formed when nickel formate dissolves in ammonia. This complex breaks down on heating to give nickel formate again. By using this water-soluble complex, catalysts may be prepared by the impregnation technique from normally water insoluble compounds such as nickel formate which is dissolved in ammonia solution, and the solution used for the impregnation of granules or pellets of the support material. The catalyst is then dried, and activation is carried out by the method described under (b).

After the reduction, the nickel catalyst should not be allowed to come into contact with air or spontaneous oxidation of the nickel to nickel oxide may occur.

Preferably the activated catalyst contains 2 to 20% by wt. of elemental nickel, based on the total weight of catalyst.

Suitable catalysts for treatment with sulphur-containing materials as hereinafter described and for use in the process of the invention include nickel supported on alumina, kieselguhr, chalk and silica gel.

A preferred catalyst is nickel-on-sepiolite.

Sepiolite is a commercially available clay mineral, which occurs naturally and which can also be prepared synthetically. It has the ideal formula

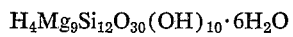

$$H_4Mg_9Si_{12}O_{30}(OH)_{10} \cdot 6H_2O$$

and is also known as Meerschaum. Further information on sepiolite and its properties may be found in "Chemistry and Industry" of Nov. 16, 1957 at pages 1492 to 1495.

Sepiolite possesses an advantage over some other bases, for example alumina, in that there is no reaction of the nickel salt with sepiolite during the heating of the catalyst to convert the nickel salt to oxide, and the final reduction can be carried out at a lower temperature than that necessary for nickel-alumina catalysts. Furthermore a nickel-on-sepiolite catalyst has little or no tendency to promote cracking or polymerisation reactions under the conditions employed according to the invention.

As stated above, the nickel catalysts are modified before use by treatment with (a) elemental sulphur or (b) an organic sulphur compound or (c) $H_2S$ or (d) $CS_2$ or (e) a mixture of two or more components, selected from (a), (b), (c) and (d), said treatment being carried out under conditions such that a minor proportion of the nickel present in the catalyst is thereby combined with sulphur.

In general, when a supported elemental nickel catalyst is treated with a sulphur-containing compound at elevated temperature, the extent of sulphiding is progressive as long as sulphur-containing compounds continue to pass over the catalyst and ultimately there is obtained a fully sulphided catalyst.

However, certain classes of sulphur-containing compounds are only effective for a more limited degree of sulphiding; thus after a certain degree of sulphiding is reached, the use of further quantities of these sulphur-containing compounds does not substantially change the degree of sulphiding. In some cases the degree of sulphiding may be substantially independent of the sulphiding conditions and thus the degree of sulphiding will be determined by the selection of the sulphur-containing compound.

Sulphiding conditions which may be varied include temperature, pressure and flow rate. Usually the sulphiding agent will be used in the vapour phase.

By the use of an organic sulphur compound which is only capable of effecting a limited degree of sulphiding it is possible to obtain a catalyst which has been uniformly sulphided on the surface. Thus while it would be possible to use, for sulphiding, a calculated quantity of an organic sulphur compound which does not possess this property, the resulting catalyst will be sulphided to an undesirably high degree when the catalyst surface is readily accessible to the organic sulphur compound; while it is possible to achieve an average degree of sulphiding equal to a required value, the catalyst will be in part, over-active and, in part, under active.

Thiophenes, thiacycloalkanes and dialkylmonosulphides effect only a limited degree of sulphiding, as described hereinbefore, and these compounds are preferred for use in modifying the supported catalysts used in accordance with the present invention. Other sulphur-containing organic compounds for example mercaptans and dialkyl disulphides, and elemental sulphur, hydrogen sulphide and carbon disulphide are examples of compounds which tend to progressively sulphide the catalyst unless the sulphiding conditions are carefully controlled.

A particularly preferred class of organic sulphur compounds for use in the treatment of the catalyst consists of the thiophenes. As stated hereinbefore, it has been found that these compounds are capable of sulphiding the nickel catalyst to a satisfactory extent, that is without excessive sulphide formation, even when used in excess of the amount required to provide the required amount of sulphur. Preferred thiophenes have 4 to 10 carbon atoms/molecule. Suitably there is used, for modifying the catalyst, a gasoline containing sulphur predominantly or entirely present as thiophenes. A preferred gasoline is a steam cracked gasoline produced by cracking, in the presence of steam, petroleum distillate fractions, for example Primary Flash Distillate of naphthas, fractions preferably boiling within the range 50° C. to 250° C. Preferred cracking temperatures for the production of gasolines, for use in sulphiding the catalyst, exceed 1100° F. (593° C.); suitable temperatures lie in the range 1100° F. to 1400° F. (593–760° C.); and suitable cracking pressures lie in the range 0 to 60 lbs./sq. in. gauge. Preferably the gasolines have a total sulphur content of 0.005 to 0.2% by weight.

Another class of organic sulphur compound which may be employed consists of the mercaptans. However in general when using elemental sulphur $H_2S$, $CS_2$ or organic sulphur compounds other than thiophenes, thiacycloalkanes and dialkylmonosulphides, the use of an excess of these materials, over the amount containing the amount of sulphur required for reaction with a minor proportion of the nickel, will lead to excessive sulphiding of the catalyst; when using these materials they will usually be employed in the stoichiometric quantities required for the sulphiding of the required proportion of the elemental nickel present in the catalyst.

If desired the sulphur containing material for sulphiding the catalyst may be used in admixture with the feed-stream to each of the catalyst beds used.

In continuous operation the sulphiding will, in general, only be required during the start up; however, further quantities may be passed intermittently or a reduced quantity may be passed continuously with the feedstock.

Usually the treatment of the catalyst to cause sulphiding will be carried out at a temperature from 0–300° C. and at any convenient pressure, being sub-atmospheric, atmospheric or super-atmospheric.

If desired, the treatment of the catalyst may be carried out in the presence of hydrogen.

Usually the amount of the sulphur-containing material which is reacted with the catalyst will be such that the catalyst contains 1 to 40 ml. percent of sulphur, based on the elemental nickel content of the unmodified catalyst.

The process of the present invention is particularly suitable for the isomerization of a propylene dimer or a $C_6$ feedstock in which 4-methylpentene-1 predominates. The resulting isomerizate will predominate in 2-methylpentene-2.

The present process may be operated in a batch-wise manner or in a continuous manner as may be desired. High conversions may be achieved when the feed-rate is in the range 0.1 to 20 v./v./hour.

The invention will now be illustrated by reference to the following example.

A mixture consisting of 75% by weight of 4-methylpentene-1, 14% 4-methylpentene-2, 7% n-hexenes and small amounts of 2-methylpentene-1 and 2-methylpentene-2 was passed at 160° C. and liquid hourly space velocity of 2 v./v./hr. over a sulphided nickel-sepiolite catalyst containing 9.4% nickel and 0.58% sulphur. The catalyst was prepared as follows:

A catalyst containing nickel formate on sepiolite (20 ml.) was reduced in hydrogen (10 l./hr.) for 1 hr. at 250° C., the product consisting of 9.8% nickel metal by weight. This was sulphided by passing 60 ml. of a 0.5% vol. solution of tetrahydrothiophen in propylene dimer over the catalyst in 1.5 hr. at 200° C., together with hydrogen at 1 l./hr., at the end of which treatment the catalyst was ready for use. During the isomerization reaction, hydrogen was passed at such a rate that the molar ratio of olefins to hydrogen was 15.

The product obtained contained methylpentenes in the equilibrium proportions, that is 1.4% 4-methylpentene-1, 17.2% 4-methylpentene-2, 17.4% 2-methylpentene-1 and 64% 2-methylpentene-2.

The above product was passed over a further sample of the same catalyst as used above at 90° C. and a liquid hourly space velocity of 1 v./v./hour. Hydrogen was passed at such a rate that the molar ratio olefin to hydrogen was 15. The product contained methylpentenes in the proportions 0.8% 4-methylpentene-1, 14.8% methylpentene-2, 13.6% 2-methylpentene-1 and 70.8% 2-methylpentene-2.

Thus by operating at 160° C. and then at 90° C. the amount of 2-methylpentene-2 produced was raised from 64% to 71%.

The theoretical equilibrium amount of 2-methylpentene-2 obtainable at 90° C. is 72%, but at all practical feedrates i.e. above 0.2 v./v./hour the maximum conversion obtainable operating a single stage process at 90° C. is in the region of 30% 2-methylpentene-2.

We claim:
1. A process for the isomerization of a mono-olefinic hydrocarbon by double bond migration which comprises passing said hydrocarbon over a catalyst at a temperature in the range 140–180° C., said catalyst comprising nickel supported on a support material selected from the group consisting of sepiolite, alumina, kieselguhr, chalk, and silica gel, said nickel, in said temperature range, being present in a major proportion as an elemental nickel, said catalyst having been previously modified by treatment with at least one sulphur-containing material selected from the group consisting of elemental sulphur, hydrogen sulphide, carbon disulphide, thiophenes, thiacycloalkanes, dialkylmonosulphides, mercaptans, dialkyldisulphides, and mixtures of the foregoing, at a temperature in the range 0–300° C. such that a minor proportion of the nickel present in the catalyst is thereby combined with sulphur, passing the resulting reaction product over a catalyst bed of the same composition as in the first stage at a temperature in the range 60–100° C. and thereafter recovering isomerized olefin as the product.

2. A process for the isomerization of a mono-olefinic hydrocarbon by double bond migration which comprises passing said hydrocarbon over a catalyst at a temperature in the range 140–180° C., said catalyst comprising nickel supported on sepiolite, said nickel, in said temperature range, being present in major proportions as elemental nickel, said catalyst having been previously modified by treatment with at least one sulphur-containing material selected from the group consisting of elemental sulphur, hydrogen sulphide, carbon disulphide, thiophenes, thiacycloalkanes, dialkylmonosulphides, mercaptans, dialkyldisulphides, and mixtures of the foregoing, at a temperature in the range 0–300° C. such that a minor proportion of the nickel present in the catalyst is thereby combined with sulphur, passing the resulting reaction product over a catalyst bed of the same composition as in the first stage at a temperature in the range 60–100° C. and thereafter recovering the isomerized olefin as the product.

3. A process according to claim 2 wherein said reaction products are passed over a separate bed of said modified catalyst.

4. A process according to claim 2 wherein a single catalyst bed is employed over which there exists a temperature gradient of 140–180° C. to 60–100° C.

5. A process according to claim 2 wherein the olefin is passed over said catalyst at a temperature of about 160° C. and the reaction products are thereafter subjected to a bed of said catalyst at a temperature of about 90° C.

6. A process according to claim 2 wherein the isomerization is carried out in the presence of hydrogen.

7. A process for the isomerization of an olefin feed containing at least one methylpentene selected from the group consisting of 4-methylpentene-1, 4-methylpentene-2 and 2-methylpentene-1 by double bond migration comprising: passing said feed at about 160° C. over a catalyst bed comprising nickel supported on sepiolite which catalyst has been modified by treatment with tetrahydrothiophene, thereafter passing the reaction product over a further bed of said modified catalyst at about 90° C. and recovering 2-methylpentene-2 from the product.

References Cited by the Examiner

UNITED STATES PATENTS

| 2,313,053 | 3/1943 | Simo et al. | 260—683.2 |
| 3,054,832 | 9/1962 | Cabbage | 260—666 |
| 3,113,097 | 12/1963 | White et al. | 208—255 |
| 3,116,345 | 12/1963 | Slaymaker | 260—683.15 |
| 3,180,905 | 4/1965 | McDonald et al. | 260—683.74 |
| 3,182,097 | 5/1965 | Brennan et al. | 260—683.65 |
| 3,215,751 | 11/1965 | Bourne et al. | 260—683.2 |

DELBERT E. GANTZ, *Primary Examiner.*

R. H. SHUBERT, *Assistant Examiner.*